United States Patent
Stocking

(10) Patent No.: US 8,217,622 B2
(45) Date of Patent: Jul. 10, 2012

(54) PATIENT IDENTIFICATION AND LABELING SYSTEM INCORPORATED INTO A PORTABLE BIN AND EXHIBITING ELECTRICAL CHARGE ARCHITECTURE FOR RECHARGING AN ELECTRONIC DEVICE PLUGGED INTO THE BIN ARCHITECTURE ONCE THE BIN IS SET UPON A PEDESTAL CHARGING BASE

(76) Inventor: Mark A. Stocking, Harrison Township, MI (US)

( * ) Notice: Subject to any disclaimer, the term of this patent is extended or adjusted under 35 U.S.C. 154(b) by 405 days.

(21) Appl. No.: 12/478,253

(22) Filed: Jun. 4, 2009

(65) Prior Publication Data

US 2010/0127661 A1    May 27, 2010

Related U.S. Application Data

(60) Provisional application No. 61/116,665, filed on Nov. 21, 2008.

(51) Int. Cl.
*H02J 7/00* (2006.01)
(52) U.S. Cl. ......... 320/115; 320/107; 320/113; 422/104
(58) Field of Classification Search ........... 320/107, 320/112–115; 422/104
See application file for complete search history.

(56) References Cited

U.S. PATENT DOCUMENTS

| | | | |
|---|---|---|---|
| 5,157,318 A * | 10/1992 | Wang | 320/110 |
| 5,544,784 A | 8/1996 | Malaspina | |
| 6,008,652 A | 12/1999 | Theofanopoulos et al. | |
| 6,102,284 A | 8/2000 | Myers et al. | |
| 6,323,622 B1 | 11/2001 | Lin et al. | |
| 6,534,953 B2 * | 3/2003 | Shirakawa | 320/114 |
| 6,593,723 B1 | 7/2003 | Johnson | |
| 7,023,179 B2 | 4/2006 | Nagai et al. | |
| 7,187,156 B2 | 3/2007 | Nakasho et al. | |
| 7,501,795 B2 | 3/2009 | Bertness et al. | |
| 2002/0063550 A1 | 5/2002 | Chen et al. | |
| 2004/0004459 A1* | 1/2004 | Bailey | 320/107 |
| 2004/0217733 A1 | 11/2004 | Liu et al. | |
| 2005/0225294 A1* | 10/2005 | Bozzone et al. | 320/132 |
| 2007/0221515 A1* | 9/2007 | Lindley | 206/223 |
| 2008/0150482 A1 | 6/2008 | Yazdi et al. | |
| 2008/0157712 A1 | 7/2008 | Garcia | |
| 2008/0252251 A1 | 10/2008 | Joasil | |
| 2008/0258680 A1 | 10/2008 | Frerking et al. | |
| 2008/0299007 A1* | 12/2008 | Noguchi et al. | 422/65 |

FOREIGN PATENT DOCUMENTS

WO  WO-2006021941 A1  3/2006

* cited by examiner

*Primary Examiner* — Samuel Berhanu
(74) *Attorney, Agent, or Firm* — Gifford, Krass, Sprinkle, Anderson & Citkowski, P.C.

(57) ABSTRACT

A specimen supporting and labeling system including the provision of at least one electronic device. A volume defining bin holds a plurality of specimens and supports the electronic device. A pedestal charging base seats within a recessed underside associated with the bin, with a first plurality of contact locations communicated along an upper face of the charging base. A second plurality of contact locations communicates along a bottom face of the bin associated with the recessed underside. The bin further incorporates an interior architecture extending from the second contact locations and communicates a charge originating from the base to the electronic device.

12 Claims, 5 Drawing Sheets

PATIENT IDENTIFICATION AND LABELING SYSTEM INCORPORATED INTO A PORTABLE BIN AND EXHIBITING ELECTRICAL CHARGE ARCHITECTURE FOR RECHARGING AN ELECTRONIC DEVICE PLUGGED INTO THE BIN ARCHITECTURE ONCE THE BIN IS SET UPON A PEDESTAL CHARGING BASE

CROSS-REFERENCE TO RELATED APPLICATIONS

The present application claims the priority of U.S. Provisional Patent Application Ser. No. 61/116,665, filed Nov. 21, 2008 and entitled Patient Bedside Power Caddy Label System.

FIELD OF THE INVENTION

The present invention is related generally to a portable and volume defining, carry-able bin which incorporates both one or more portable and task specific electronic devices, combined with accommodation for a number of specimen related items. More specifically, the present invention teaches such a bin for use in the medical industry (and in particular for use by phlebotomists and nurses) and which can quickly and conveniently recharge the electronic items contained within the bin. The system combines the features of a specimen carrying bin along with an electronic architecture incorporated into the bin design and which communicates electrical charge from a pedestal charging base to power cords extending from the bin to the electronic devices, this occurring upon the bin being set upon the pedestal charging base, with the recharging of the batteries occurring while they remain installed within the respective electronic devices (e.g. mobile printer, barcode scanner or other personal digital assistant, i.e. PDA).

BACKGROUND OF THE INVENTION

A number of battery holding and charging devices are known in the art, the purpose for which being to quickly and effectively recharge one or more batteries associated with a given device. Examples of these include such as the holder and battery charger system for portable electronic devices as set forth in Garcia 2008/0157712.

A charger cradle used for charging a battery of a portable electronic device is further disclosed in Yazdi 2008/01501482 and in which an electromagnetic device is disposed within a charger cradle proximate a metal piece of a cordless handset. The electromagnetic device generates a magnetic field creating an attractive force to assisting in retaining the handset when it is placed in a receiving portion of the charger cradle.

In the medical profession, it is also known to use a combination of portable electronic devices, such as portable printers, bar code scanners and PDA's, such as further in the field of phlebotomy. In this particular field, it is desirable to be able to draw, tag and correctly retain multiple specimens, while utilizing the associated electronic devices in a convenient fashion to ensure accuracy, such heretofore being a challenge in the prior art.

SUMMARY OF THE INVENTION

The present invention discloses a specimen supporting and labeling system, such as including the provision of at least one application relevant electronic device. The system includes a volume defining bin holds a plurality of specimens and supports the electronic device. A pedestal charging base seats within a recessed underside associated with the bin, with a first plurality of contact locations communicated along an upper face of the charging base. A second plurality of contact locations communicates along a bottom face of the bin associated with the recessed underside.

The bin further incorporates an interior architecture extending from the second contact locations and communicates a charge originating from the base to the electronic device. Additional features includes the pedestal charging base receiving an AC power supply for converting the same to an output DC current and further including a fuse in communication with an inlet location for receiving the AC power supply.

One or more electronic device specific power adapter units are incorporated into the pedestal base, at a location between the fuse and the first plurality of contact locations incorporated into the base. A pressure activated mechanical relay switch is incorporated into the pedestal charging base, in cooperating fashion with the first plurality of contact locations. A selected contact associated with the second plurality of contact locations extends from the bin underside engaging the relay switch to establish a closed charging circuit concurrent with the bin setting upon the pedestal base.

The second plurality of contact locations projects downwardly from the recessed bin underside and seats through apertures defined in the upper face of said pedestal charging base to engage the first plurality of contact locations defined within the base. The second plurality of contact locations each further includes a male end projecting and spring loaded pin. The first plurality of contact locations each further exhibits a pair of opposing spaced and female receiving channel defining portions for receiving therebetween the male pins.

An LED indicator lamp is incorporated into a visible location of the bin and communicates, via a line extending from an charging output associated with the second contact locations, to confirm establishment of a closed charging circuit. The bin includes an integrally defined and upwardly extending carrying handle, and further configures first and second integrally defined charger cradles located at opposite ends of the handle for receiving first and second electronic devices.

A charging contact is engageable with each electronic device (such as a handheld barcode scanner, mobile printer or PDA) and, upon the device being seated with said cradle, establishes a closed charging circuit. The interior architecture associated with the bin can also generating a magnetic field which is communicated to the cradle and for attracting a metal portion associated with the electronic device.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

The present teaches such an article supporting bin, such as for use in the medical industry (and in particular for use by phlebotomists and nurses) and which can quickly and conveniently recharge the electronic items contained within the bin. As will be described throughout the succeeding illustrations, the system combines the features of a specimen carrying bin, along with an electronic architecture incorporated into the bin design and which communicates electrical charge from a pedestal charging base to power cords extending from the bin to the electronic devices.

Recharging of the portable electronic devices occurs upon the bin being set upon the pedestal charging base, with the recharging of the batteries occurring while they remain installed within the respective electronic devices (e.g. mobile printer, barcode scanner or other personal digital assistant, i.e. PDA) and by virtue of a device specific power connecting cord extending from the electrical architecture of the bin and plugging into the device. Additional to the medical/phlebotomy variant described herein, it is further envisioned and understood that the system according to the present invention can be equally and as effectively applied to any environment (including those outside of the medical field) and in which it is desired to provide an article carrier (such as including any of a tray, bin or base), combined with dedicated interior architecture interfacing between a pedestal recharging base and one or more task specific portable electronic devices supported within the article carrier.

Referring again to FIG. 1, an environmental view is shown in perspective at 10 of a specimen supporting and labeling system and includes a portable carrying bin 12 set upon a pedestal charging base (further shown in phantom). The bin 12 includes a heavy duty and insulated plastic construction including a multi-sided outer extending and depth defining wall. An integrally formed and centrally/upwardly extending carrying handle is farther shown at 14, a recessed interior being defined in the bin between the handle 14 and the outer disposed walls (again at 12). The bin further exhibits multiple vial receiving cavities, see at 16, 18, 20, et. seq., these capable of holding such as medical (blood) vials 22, 24, 26, et. seq. in an organized fashion.

Figure 1:
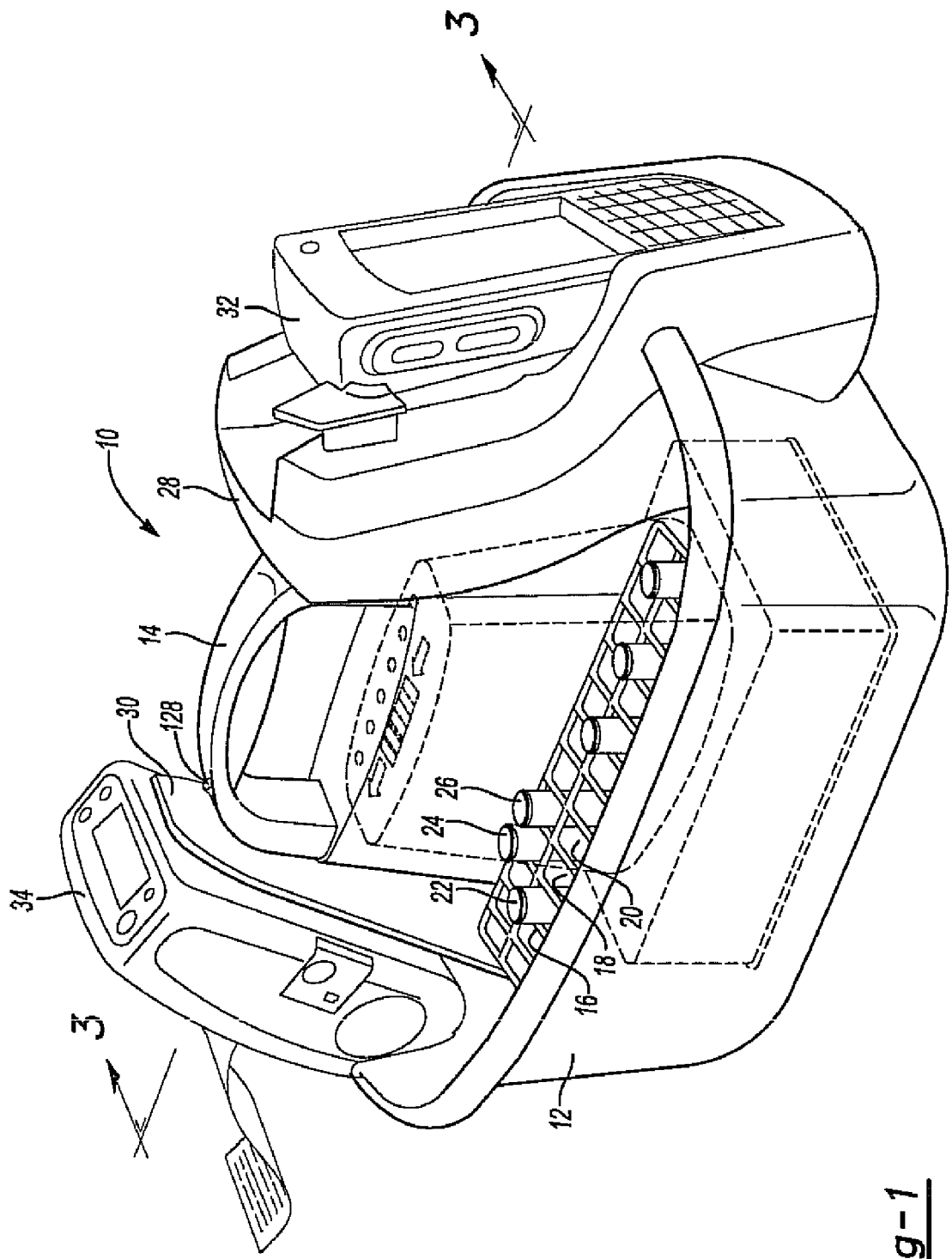
FIG. 1 is an environmental view in perspective of the portable carrying bin according to one possible variant of the present inventions.
Figure 2:
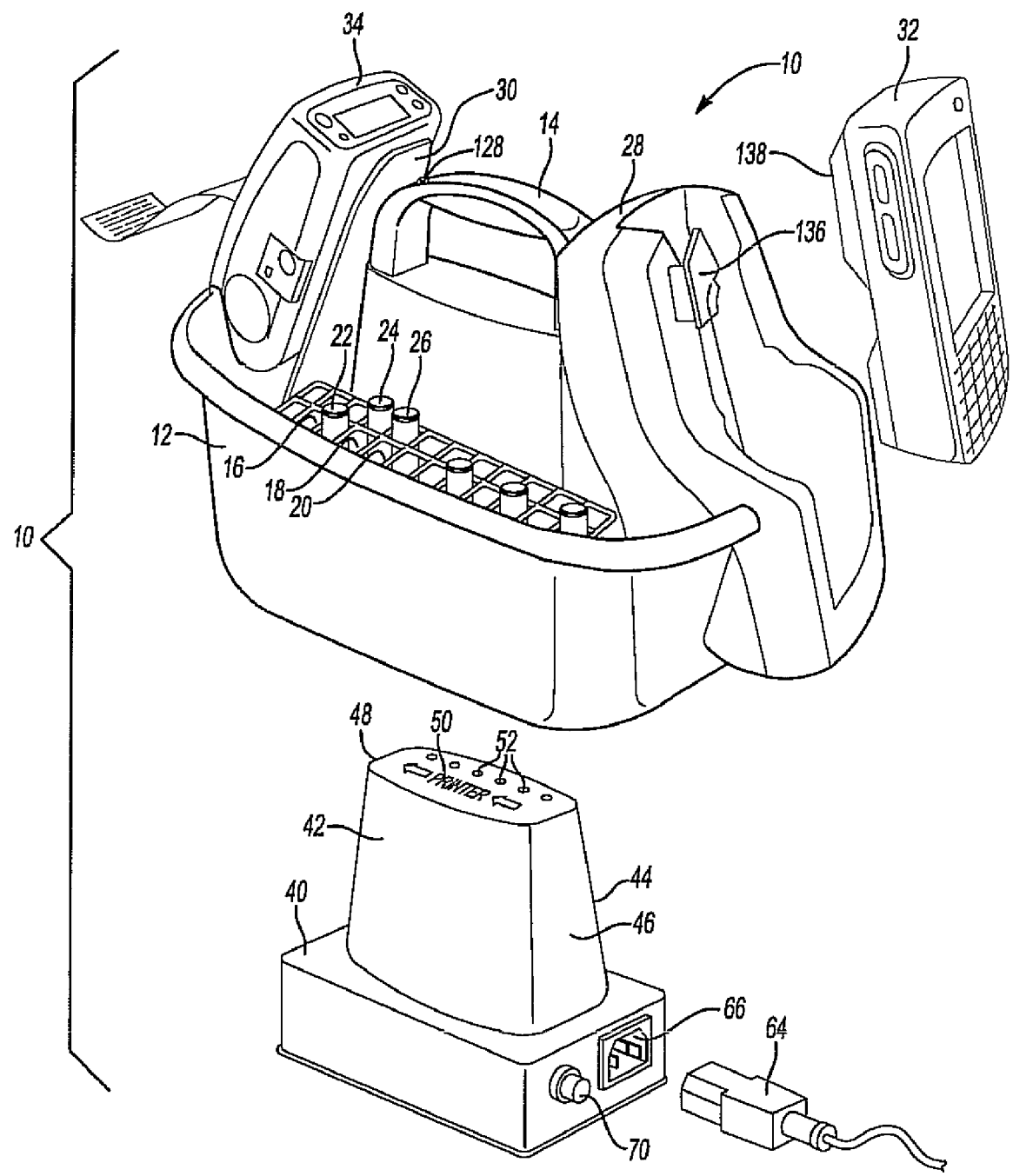
FIG. 2 is an exploded view of FIG. 1 and further illustrating the features of the pedestal charging base, the specimen supporting and organizing bin, and the associated portable electronic devices which are supported upon the bin.
Figure 3:
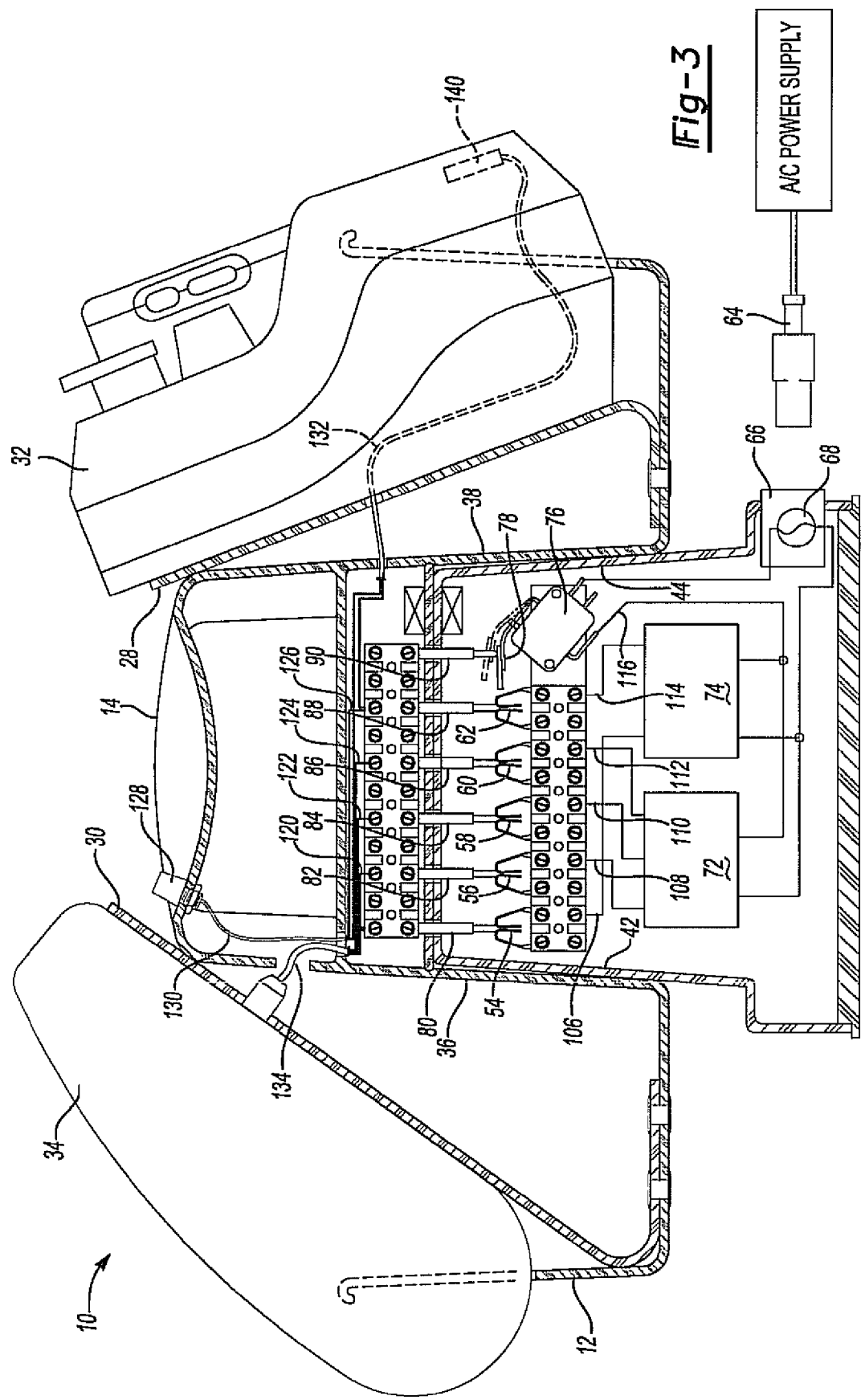
FIG. 3 is a cutaway view taken along line 3-3 of FIG. 1 and further illustrating the interior charging architecture associated with both the bin and pedestal charging base.

As further shown in each of FIGS. 1-3, the bin also includes configures first and second integrally defined charger cradles, see at 28 and 30, in the illustrated embodiment shown as located at opposite ends of the handle 14 and for receiving first 32 and second 34 of the electronic devices. As best shown in the exploded view of FIG. 2, the selected cradle 28 exhibits an interior configuration suitable for receiving the selected device 32 (such as portable PDA and/or patient wristband barcode scanner), the other cradle 30 also being shown in FIG. 3 and providing seating capacity for the other portable device 34 (e.g. mobile printer).

As further best shown in the lineal cutaway of FIG. 3, the bin exhibits a central underside recess, this further being defined by depth extending inner walls 36 and 38 (the distance between these and the outer walls such as at 12 establishing the volume holding interior of the bin. The pedestal charging base 40 (see as best shown in FIG. 2) includes an upwardly configured side walls 42 and 44 (with interconnecting end walls as further shown at 46 and 48), the three dimensional and upwardly extending configuration of the pedestal base being such that it seats in mating and supporting fashion within the underside of the bin. Although not shown, it is understood that the mating configuration established between the bin and pedestal charging base can be modified from that shown and within the scope of the invention.

An upper face 50 of the pedestal charging base 40 (as best shown in FIG. 2) exhibits a plurality of apertures 52, these communicating to a first plurality of interiorly positioned and supported contact locations 54, 56, 58, 60, and 62 (see also FIGS. 3 and 4) defined within the charging base. Additional features associated with the pedestal charging base include an input AC power supply 64 seating within an input location 66 of the pedestal charging base. A fuse 68 (see FIGS. 3 and 4) is provided to guard against the occurrence of an AC current surge, and au on/off reset trigger is also shown at 70 (FIG. 2).

One or more electronic device specific power adapter units, such as shown at 72 and 74 in the FIG. 3 cutaway, are incorporated into the pedestal base 40 at a location between the fuse 68 and the first plurality of contact locations 54-62 incorporated into the base. The power adaptor units operate to converting the AC power input to a regulated output DC current. A pressure activated mechanical relay switch is also shown at 76 and is incorporated into the pedestal charging base, in cooperating fashion with the first plurality of contact locations 54-62 and further such that a trigger portion 78 of the switch 76 (again shown in FIGS. 3 and 4) is positioned in interior communicating fashion with an end-most of the pedestal base situated apertures 52.

Figure 4:
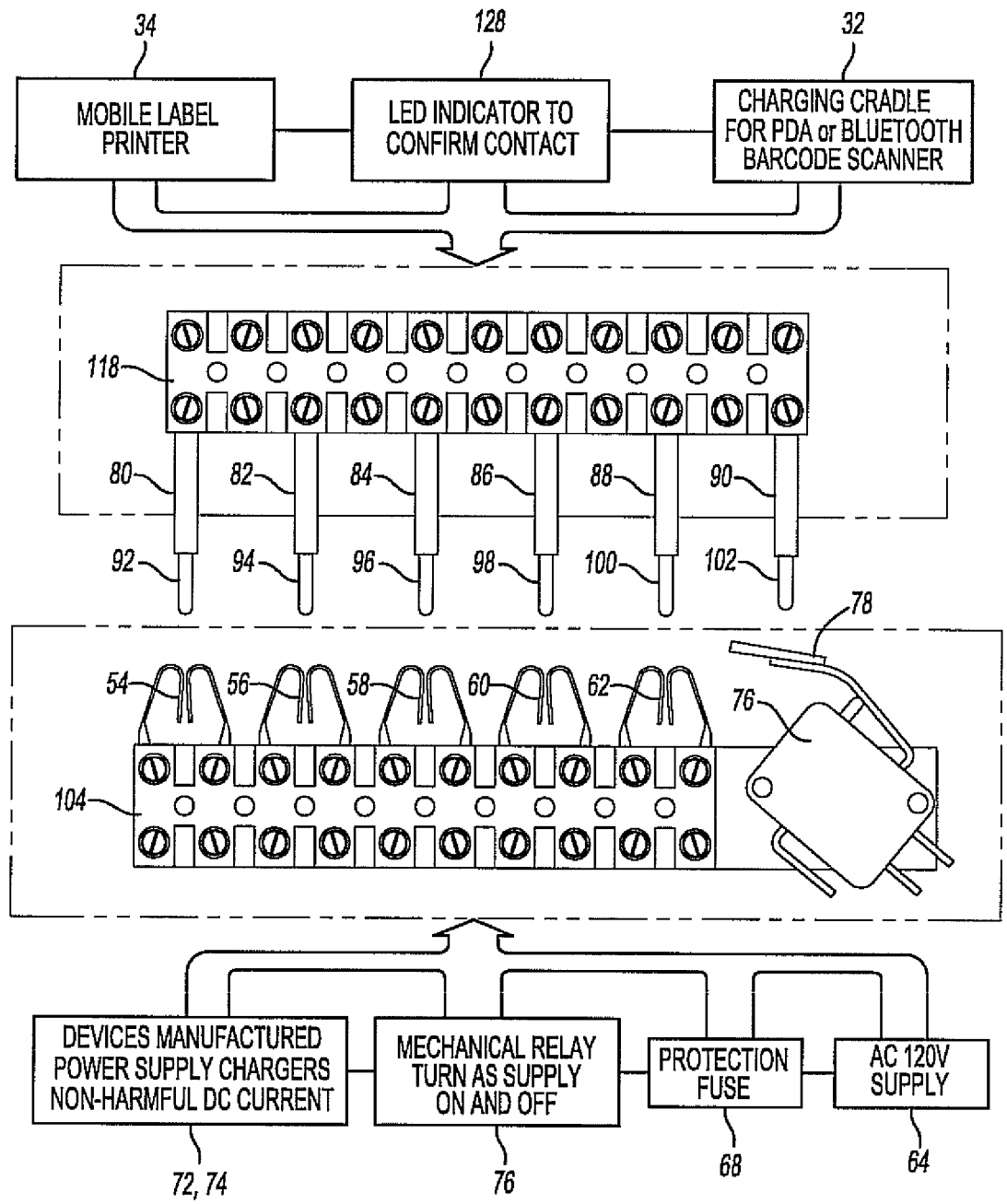
FIG. 4 is a related and combined architecture and flow diagram of the bin and pedestal charging base shown in FIG. 3.

As again best shown in FIGS. 3 and 4, a second plurality of contact locations, at 80, 82, 84, 86, 88 and 90 are configured in downwardly extending fashion from the recessed underside of the bin. The contact locations 80-90 form a portion of the interior electrical architecture incorporated into the bin and each further includes a male end extending and spring loaded pin (see as best shown by pins 92, 94, 96, 98, 100 and 102 corresponding to contact locations 80-90 in the modified view of FIG. 4).

As further shown, and upon securing the bin upon the charging base, the spring loaded pins 92-100 communicate through the surface apertures 52 and respectively engage a pair of opposing spaced and female receiving channel defining portions corresponding to each of the first contact locations 54-62. The spring loaded pin 102 associated with the further (or sixth) second contact location communicates through an end-most positioned aperture 52 and engages the trigger 78 associated with the relay, this resulting in the establishment of a closed circuit and the ability of DC charging power to flow through the established contacts and into the bin.

As illustrated in each of FIGS. 3 and 4, the first plurality of contact locations 54-62 extend from a common bus 104 incorporated into the pedestal base, the bus 104 being communicated by a plurality of lines, see further at 106, 108, 110, 112 and 114 (FIG. 3) extending from the adapter units 72 and 74. A further communicating line 116 extends from the selected adapter unit 74 to an input side of the relay 76 and, upon deflection of the trigger 74 by the associated pin 102, establishes the desired closed circuit to permit current flow into the bin. While a total of six individual contact locations are illustrated, it is understood that any plurality of dedicated contact locations can be established between the bin and charger base and pursuant to any specified variant not limited to that particularly described and illustrated.

As again best shown in FIG. 4, a further common bus 118 is established on an output side of the second contact locations 80-90 associated with the interior bin architecture. FIG. 3 further shows a plurality of output lines 120, 122, 124, and 126 associated with the output bus 118. An LED indicator lamp 128 is located at a visible location of the bin (such as shown being a top corner location of the handle 14) and is communicated to the bus output line 120, via a further line 130 (again FIG. 3) and, when illuminated, confirms the existence of a closed charging circuit established between the bin and pedestal charging base.

Additional charging contacts are shown at 132 and 134 (see again FIG. 3) extend from selected output lines 120-126 and engage input locations associated with the portable electronic devices in order to charge the same. Additional to the lines illustrated at 132 and 134, these typically plugging into a charge location associated with each device, it is also envisioned that other cradle charging contact configurations can also be employed, such as associated with a typical phone charging arrangement and which permit the portable device to be simply engaged upon the cradle, and without the need to plug in a separate line.

As further shown in FIG. 2, the bin supported output bus 118 and associated lines 120-126 are also capable of communicating a magnetic field (such as to a location shown at 136 associated with cradle 28) for creating an attracting force against a metal portion (e.g. at 138) associated with the associated electronic device and an order to secure the same to the cradle without the requirement of additional snaps, clips or other fasteners. In this fashion, the combination bin and charger base enables convenient charging of the batteries contained within the associated electronic devices, see at shown at 140 associated with scanner 32 in FIG. 3, and without the requirement of first having to remove the batteries from the associated device for separate charging.

Figure 5:
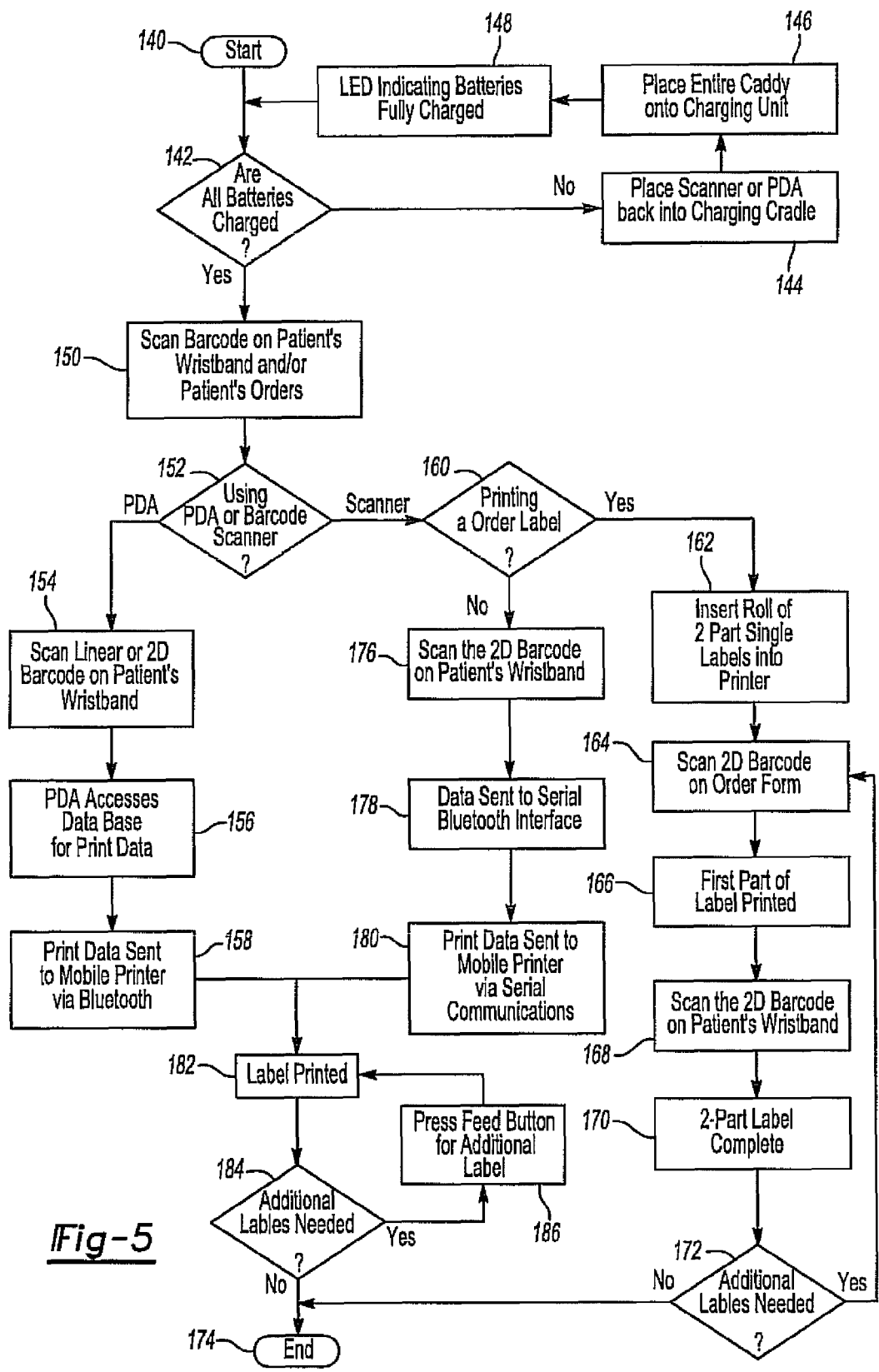
FIG. 5 is a flow chart illustrating one possible variant of operational protocol associated with one preferred embodiment of the present invention.

Referring finally to FIG. 5, a flow chart illustration is shown of one possible variant of operational protocol associated with one preferred embodiment of the present invention. As previously described, the illustrated application associated with the combination bin and charging base system focuses on the ability of medical personnel (e.g. plebotomists and nurses) to operate more efficiently by utilizing mobile and wireless technology, such as further in the scanning of barcode information contained upon a patient's wristband, this information being sent to the associated mobile printer for creation of a label, in turn applied to the relevant specimen (e.g. blood) holding vial. That said, it is again understood that the combination charging bin with interior architecture and associated pedestal charger base can be re-adapted for configuration to any other possible specimen collecting and data entry application (not limited to medical).

Referring again to FIG. 5, start position 140 is succeeded by query 142 inquiring whether all portable device batteries are charged. If no, the portable electronic device (e.g. scanner or PDA) is set upon the designated charging cradle (at step 144), following which the entire bin (or caddy) is set upon the pedestal charging unit at step 146. At step 148, the LED indicates the batteries are fully charged, further such as by converting from a solid illumination to a flashing pattern.

If the answer to query 142 is yes, the indicated medical personnel scans barcode information on the patient's wristband or records other patient information (at step 150) such as further using the PDA or barcode scanner (at 152). If a PDA is used, a linear or 2D scan of patient wristband is done at step 156, following which the PDA accesses a data base for print data (at 156) and proceeds to print the data sent to the mobile printer such a via Bluetooth technology (at 158).

If a scanner is used rather than a PDA, query 152 is followed by a query as to whether to print an order label, at 160. If yes, succeeding steps include inserting a roll of two part single labels into the mobile printer (step 162), scanning the 2D barcode on an order form (step 164), printing the first part of the label (at step 166), scanning the 2D barcode on the patient's wristband (step 168) and completing the two part label (at 170). Following step 170, a query 172 asks if additional labels are needed. If yes steps 164-170 are repeated. If no, the protocol advances to end 174.

If the answer to query 160 is no, the protocol advances to scanning the 2D barcode on the patient's wristband (at step 176), transmitting the data via serial Bluetooth interface (at 178), and printing the data sent to the mobile printer via serial communications (at 180). Both the step 180 and 158 outputs are connected in common to a label printing step 182, following which a final protocol query asks, at step 184, if additional labels are needed. If yes, the protocol routes to step 186 at which the feed button is pressed on the mobile printer to request an additional label. If no, step 184 progresses to previously identified end step 174.

Having described my invention, other and additional preferred embodiments will become apparent to those skilled in the art to which it pertains, and without deviating from the scope of the appended claims.

I claim:

1. A system for holding and carrying a plurality of specimen vials and including provision for supporting and recharging at least one electronic device, said system comprising:
   a volume defining and portable carrying bin exhibiting an open interior with an underside accessible recess and including an upwardly extending handle, a plurality of individual and depth extending cavities associated with said open interior and which are adapted for holding the plurality of specimens, said bin further including an integrally configured cradle location for holding and supporting the electronic device;
   a pedestal charging base including upwardly configured side walls which are dimensioned for inserting in the recessed underside associated with said bin and in order to support said bin upon said pedestal charging base; and
   a first plurality of contacts locations at an upper face of said pedestal charging base;
   a second plurality of contact locations are configured in downward extending from the recessed underside of said bin, and electrically connected with the first contact locations; and
   said bin further comprising an interior architecture extending from said second contact locations and including communicating a charge originating from said pedestal charging base to the electronic device via a charging contact engageable with the electronic device upon the device being seated with said cradle and in order to recharge the device when said bin is not in use.

2. The system as described in claim 1, said pedestal charging base having a specified shape and size and receiving an AC power supply for converting the same to an output DC current.

3. The system as described in claim 2, said pedestal charging base further comprising a fuse in communication with an inlet location for receiving the AC power supply.

4. The system as described in claim 3, further comprising at least one electronic device specific power adapter unit incorporated into said pedestal base, at a location between said fuse and said first plurality of contact locations.

5. The system as described in claim 4, further comprising a pressure activated mechanical relay switch incorporated into said pedestal charging base in cooperating fashion with said first plurality of contact locations, a selected contact associated with said second plurality of contact locations extending from said bin underside engaging said relay switch to establish a closed charging circuit concurrent with said bin setting upon said pedestal base.

6. The system as described in claim 1, further comprising said second plurality of contact locations projecting downwardly from said recessed bin underside and seating through apertures defined said upper face of said pedestal charging base to engage said first plurality of contact locations defined within said base.

7. The system as described in claim 6, said second plurality of contact locations each further comprising male end projecting and spring loaded pin, said first plurality of contact locations each further comprising a pair of opposing spaced and female receiving channel defining portions for receiving therebetween said pins.

8. The system as described in claim 1, further comprising an LED indicator lamp incorporated into a visible location of said bin and communicated, via a line extending from a charging output associated with said second contact locations, to confirm establishment of a closed charging circuit.

9. The system as described in claim 1, further comprising first and second charger cradles being configured within said bin and located at opposite ends of said handle for receiving first and second electronic devices.

10. The system as described in claim 9, said bin exhibiting a specified shape and size, said charger cradles further being configured for receiving at least one of a mobile printer, a handheld barcode scanner, and a personal digital assistant.

11. The system as described in claim 1, said interior architecture associated with said bin generating a magnetic field communicated to said cradle and for attracting a metal portion associated with the electronic device.

12. The system as described in claim 1, said bin further comprising a heavy duty and insulated plastic construction.

* * * * *